D. B. BADEAU.
Window-Sash Moldings.

No. 154,779.  Patented Sept. 8, 1874.

Witnesses:
Ernst Bilhuber
Henry Gentner

Inventor:
David B. Badeau
pr
Van Santvoord & Hauff
attys

UNITED STATES PATENT OFFICE.

DAVID B. BADEAU, OF BROOKLYN, NEW YORK.

IMPROVEMENT IN WINDOW-SASH MOLDINGS.

Specification forming part of Letters Patent No. 154,779, dated September 8, 1874; application filed June 10, 1874.

*To all whom it may concern:*

Be it known that I, DAVID B. BADEAU, of Brooklyn, in the county of Kings and State of New York, have invented a certain new and Improved Sash-Molding, of which the following is a specification:

Metallic sash-moldings have usually been made of an iron bar soldered to a trough-shaped piece of silvered sheet metal, the concavity being partially filled with the solder. This, however, is expensive to manufacture, in consequence of the large amount of solder required and the tediousness of the operation. Sash-bars have also been made of wood covered with a sheet-metal case, but this is frequently lacking in strength. In other instances a combined wood and iron bar has been covered with ornamental sheet metal.

My improved sash-bar is made for obtaining great strength in the sash-bar and lessening the cost by using but little solder and only a narrow strip of ornamental metal.

Figure 1:
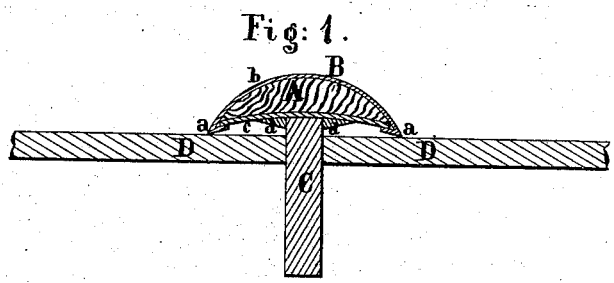
Figure 2:
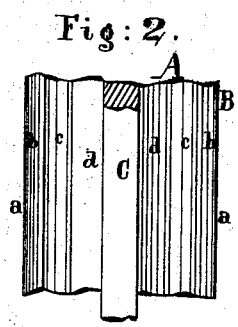

In the drawing, Figure 1 is a cross-section, and Fig. 2 an inside elevation, of the device.

The bar $c$ is of wrought-iron, and the ornamental surface is made of a strip of sheet metal, preferably plated, and this strip B is trough-shaped and usually nearly half-round, and the edges $a$ $a$ of the metal B are turned over the back plate $c$, which is either iron, brass, or other cheaper metal; and A is the wooden core. It is preferable to employ a die and draw-bench for bending the strips of sheet metal upon the core A, and folding the edges of the strip B over the edges of the back plate $c$, as at $a$. The back plate $c$ is made concave, so as to furnish a recess for putty, and for allowing the glass D to set close against the folded edges $a$ of the plate B to make a close joint. The solder applied at $d$ to the backing-plate $c$ unites the iron bar C to the middle of such backing-plate, and also unites the edges of the surface plate B to the plate $c$, thereby making a very strong, cheap, and handsome sash-bar, and firmly connecting the edges of the ornamental plate B, so that they cannot spread when under strain.

I claim as my invention—

The concave back plate $c$, soldered to the folded edges $a$ of the ornamental surface plate B and to the iron bar $c$, as and for the purposes set forth.

In testimony that I claim the foregoing I have hereunto set my hand and seal.

DAVID B. BADEAU. [L. S.]

Witnesses:
W. HAUFF,
E. F. KASTENHUBER.